Oct. 31, 1933.          J. A. MILLER          1,933,531
                        SAWING MACHINE
                     Filed May 20, 1932          4 Sheets-Sheet 1
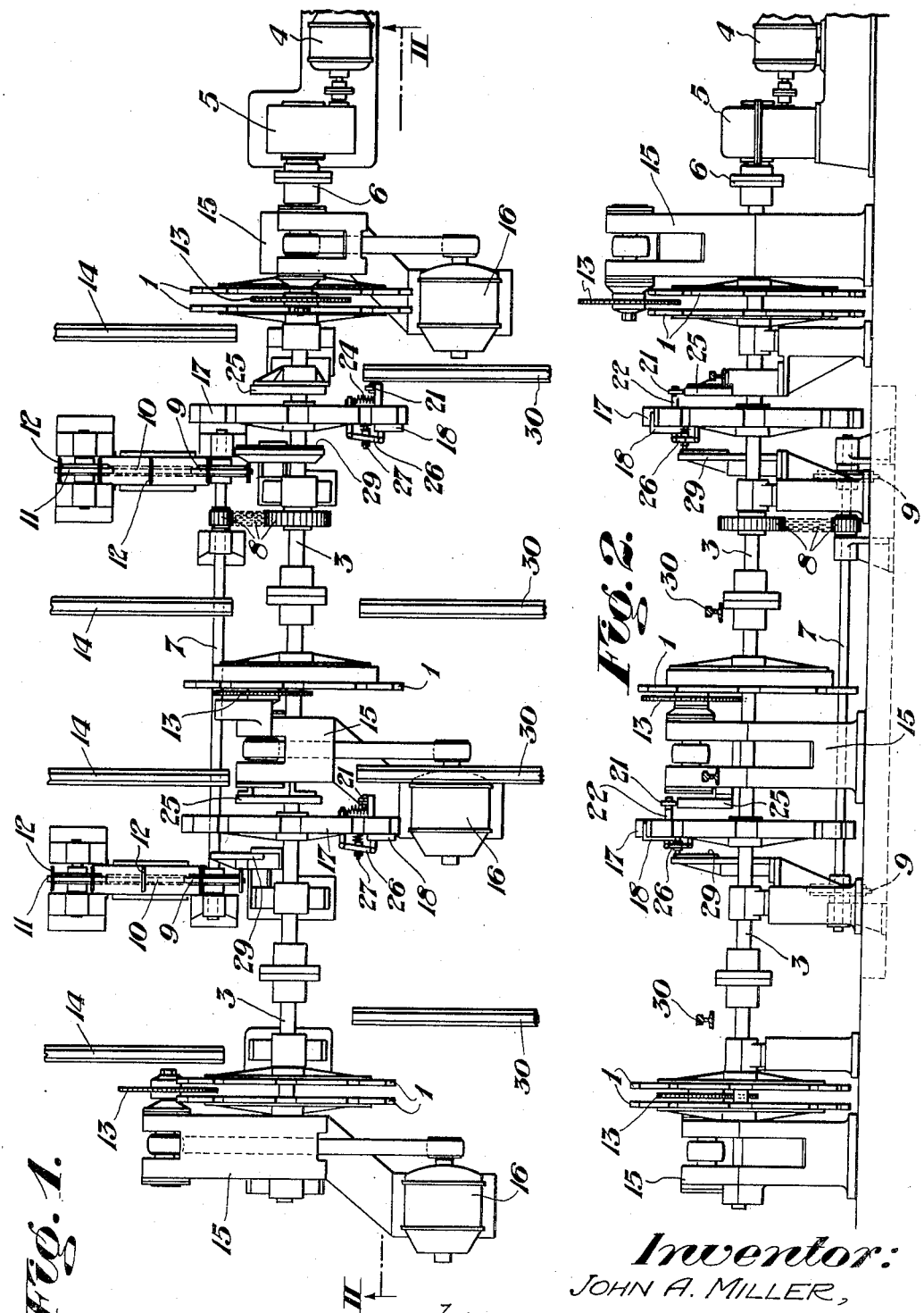
Inventor:
JOHN A. MILLER,
by: Msina & Rauber
his Attorneys.

Oct. 31, 1933.   J. A. MILLER   1,933,531
SAWING MACHINE
Filed May 20, 1932   4 Sheets-Sheet 2
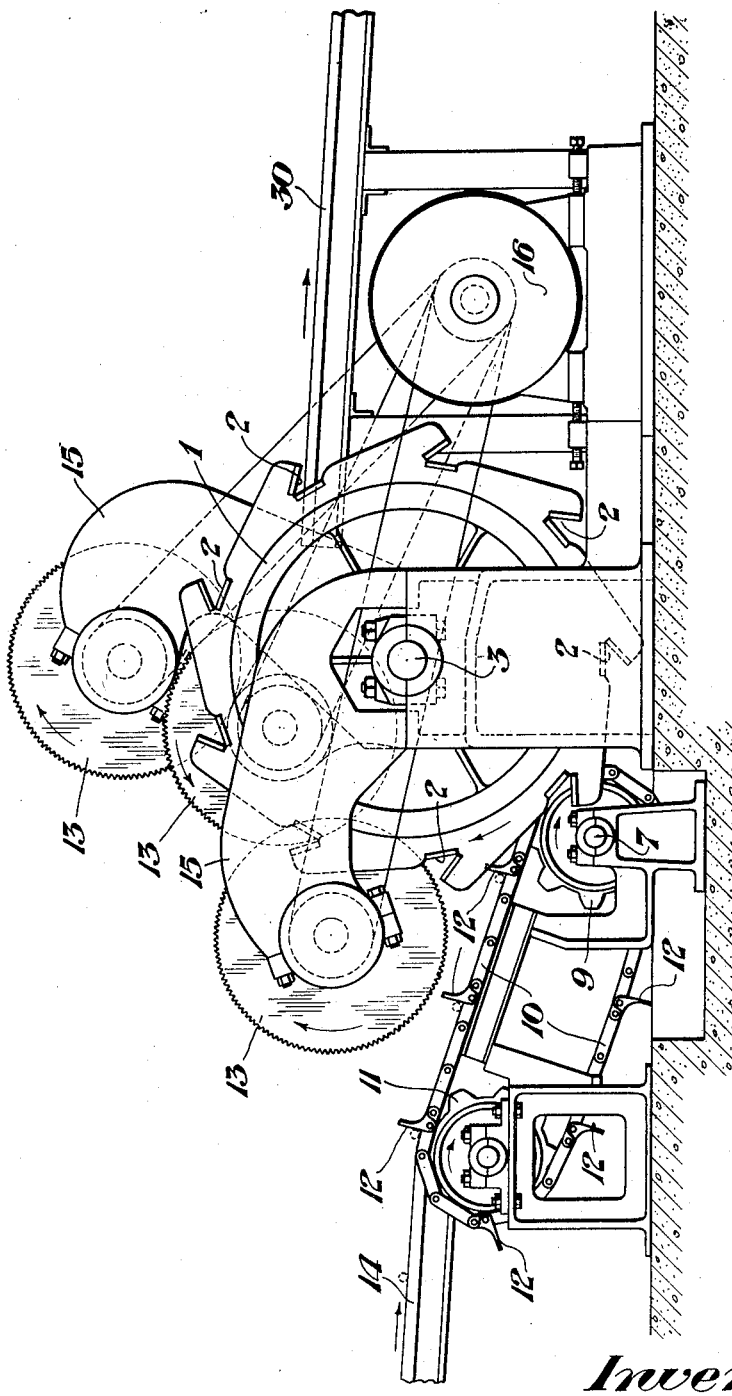
Inventor:
JOHN A. MILLER,
by: Manna + Rauber
his Attorneys.

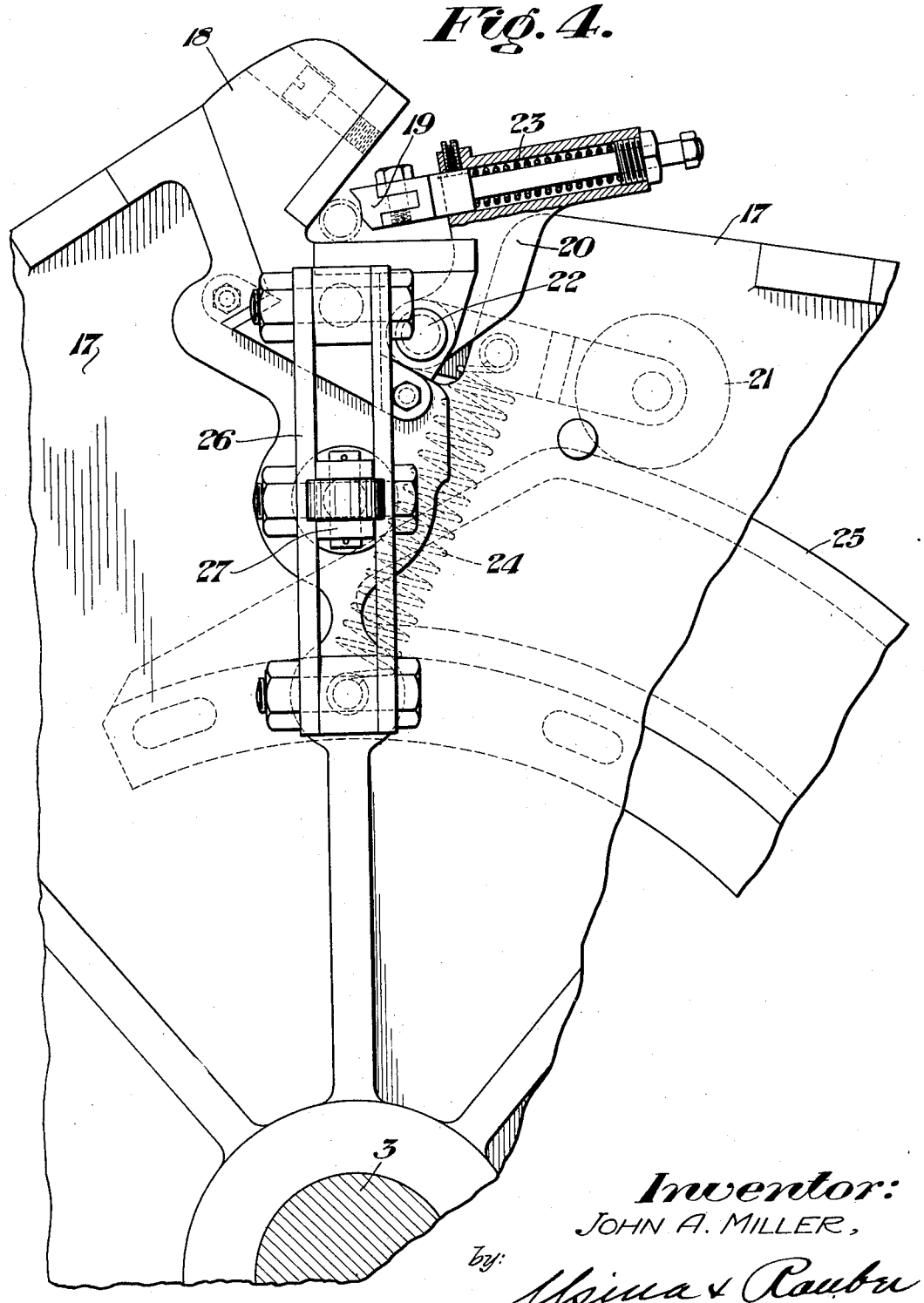

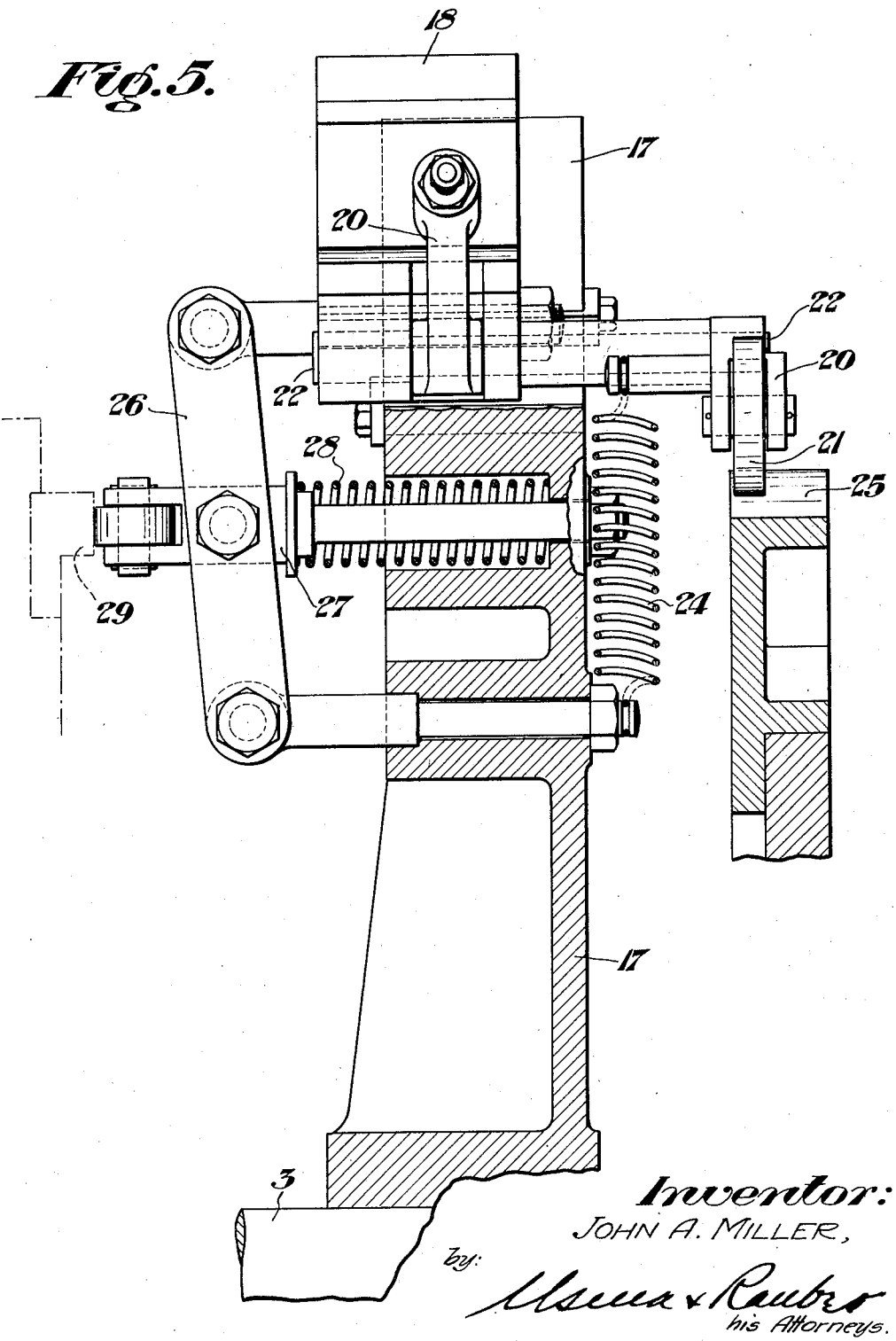

Patented Oct. 31, 1933

1,933,531

UNITED STATES PATENT OFFICE 1,933,531

SAWING MACHINE

John A. Miller, Brentwood, Pa., assignor to National Tube Company, a corporation of New Jersey Application May 20, 1932. Serial No. 612,558

4 Claims. (Cl. 29—70)

This invention relates to sawing machines and particularly to those which automatically cut elongated work, such as pipe, into commercial lengths.

The inventor's objects include the provision of a machine which will continuously receive the work and carry it into engagement with a plurality of saws arranged to successively and individually cut at spaced points. Another object is to provide a means for shifting the work away from these saws when cut thereby. This is desirable because the work is prevented from rubbing against the saw as it is carried by after being cut, and also because it provides for slight variations in the lengths of the cuts although using fixed saws. Other objects may be understood from the following.

The accompanying drawings illustrate a specific form of the invention, the various figures being as follows:

Figure 1 is a top plan.

Figure 2 is a cross-sectional side elevation from the line II—II in Figure 1.

Figure 3 is an end elevation.

Figure 4 is a detail from the first three figures.

Figure 5 is an end elevation of Figure 4.

The machine illustrated by these drawings has a plurality of axially alined spaced wheels 1 having peripheral work-carrying pockets 2 and mounted on a common shaft 3. This shaft is driven by an electric motor 4 through a gear reduction unit 5 and an interposed friction clutch 6. A second shaft 7 is arranged parallel to the shaft 3, is geared to it by a chain drive 8 and carries sprocket wheels 9 which drive conveyer chains 10. These chains are held at an incline by raised sprockets 11 and carry upstanding dogs 12 properly spaced to singly carry work to the pockets 2 on the wheels 1, a rack 14 being arranged at their upper ends to facilitate the handling of work.

As the work is fed to the wheel pockets 2 by the chains 10 it will be revolved upwardly while maintaining a horizontal position, these pockets being all horizontally alined for this purpose. There are two of these wheels at the ends of the shaft 3 and one at its mid portion. Saws 13 are arranged between each of the end wheels and at the side of the center wheel so as to cut work which is fed to them. These saws are carried on arms 15 and are belted to driving motors 16, and are respectively positioned so that as the work is moved against them by the wheels 1 it is cut one at a time.

The spacing of these saws is fixed and, as the work to be cut may sometimes be sufficiently hot to contract appreciably upon cooling, it is necessary to provide some means for shifting the same back and forth in front of these saws to vary the spacing of the cuts. It is also desirable to shift the work immediately upon being cut so that it will not rub against the saws as it is being revolved farther by the wheels 1.

Preferably this is done by sets of revolvable vises which are arranged about the common axis of the wheels 1 to grasp the work carried by the pockets 2. This action may be made to occur automatically by the use of properly arranged cams. Then by shifting these vises sidewise the work may be shifted longitudinally in its carrying pockets, producing the desired results. This shifting may likewise be performed automatically by the use of suitable cam arrangements.

In the form illustrated, revolvable mounts 17 are arranged on the shaft 3 and carry longitudinally slidable vises 18 which are alined with the pockets 2 of the wheels 1. Consequently, when the chains deposit work in the pockets 2, it is also deposited in these vises.

The vises have movable jaws 19 which are carried on the ends of bell-cranks 20 whose opposite ends carry rollers 21. The two arms of these bell-cranks are interconnected by shafts 22 which project to one side of the mounts 17 so that the roller ends are free therefrom. These jaws are mounted in the other arms of the bell-cranks 20 in sockets and are made resilient by springs 23. They are constantly urged in ungrasping position by springs 24 and are closed by cams 25 over which the rollers 21 pass. The cams are constructed and arranged so that the jaws are closed on the work while it is being sawed or whenever it must be shifted.

The vises 18 are shifted sidewise by levers 26 which are each fixedly pivoted at one end and have their other connected to one of the vises. The mid section of these levers is fixed to roller-ended plungers 27 which are urged outwardly by compression springs 28 and are moved by cams 29 constructed and arranged to contact their rollers and cause the desired shifting. As previously explained, this shifting is desirable to cause withdrawal of the work from the saws and to prevent contact between the two after cutting. The cams may also be constructed to shift the pipes before being cut so that the cutting points of the respective saws may be varied slightly to compensate for the construction of hot work.

The reason that only one wheel is required at the center of the shaft 3 is because there are no unsupported ends to cause the middle saw to bind. The pockets 2 are shaped with respect to the various saws so that the work tends to wedge itself in place. The cams 25 are shaped so that the work is released as soon as it leaves the last of the three saws, when it may drop from the pockets 2 to the discharging racks 30.

Although a specific form of this machine has been shown and described in accordance with the patent statutes, it is not intended to limit the scope of the invention exactly thereto, except as defined by the following claims.

I claim:

1. A sawing machine including at least one wheel, vises mounted on the periphery of said wheel for movement in directions parallel with the latter's axis while engaging work, means for moving said vises in said directions while said wheel is rotating and one or more saws arranged with their cutting edges in the path of work engaged by said vises.

2. A sawing machine including a plurality of axially alined spaced wheels having peripheral work-carrying means constructed and arranged for the horizontal carriage of work, revolvably mounted horizontally movable vises constructed and arranged to engage work carried by said means, projecting means for closing said vises, projecting means for horizontally moving said vises, saws arranged with their cutting edges in the path of work carried by said first named means, means for driving said saws, and a plurality of cams constructed and arranged to engage said projecting means to close said vises on said work and shift the latter with respect to said saws to positions predetermined by the cams' shapes.

3. In combination with a sawing machine constructed to hold elongated work horizontally and revolve it into engagement with the cutting edges of a plurality of saws that are arranged to successively individually cut the same at spaced points, a plurality of revolvably mounted horizontally movable vises arranged to grasp the work being sawed and having movable resilient jaws, levers arranged to close said resilient jaws and revolvable with said vises, means for urging said jaws to ungrasping position, cams arranged in the path of said levers and constructed to move same to jaw closing positions, levers arranged in horizontally moving connection with said vises and revolvable therewith, bearing members in connection with said levers, cams arranged in the path of said bearing members and means for urging said levers towards said cams.

4. In combination with a sawing machine constructed to hold elongated work horizontally and revolve it into engagement with the cutting edges of a plurality of saws that are arranged to successively individually cut the same at spaced points, a plurality of revolvably mounted horizontally movable vises arranged to grasp the work being sawed and including movable resilient jaws, means revolvable with said vises for closing the movable jaws thereof, means for urging said jaws to ungrasping position, cams constructed and arranged to move said first named means to jaw-closing position when revolved thereagainst, means for horizontally moving said vises, cams constructed and arranged to move said horizontally moving means and means for urging said last-named means towards said cams.

JOHN A. MILLER.